May 8, 1962  T. STAUB  3,034,126
RECORDING INSTRUMENT
Filed Oct. 24, 1960

INVENTOR
THEODOR STAUB
By Wenderoth, Lind & Ponack
ATTORNEYS 3,034,126
RECORDING INSTRUMENT
Theodor Staub, 3 Weingartenstrasse, Richterswil,
Zurich, Switzerland
Filed Oct. 24, 1960, Ser. No. 64,362
4 Claims. (Cl. 346—102)

The present invention relates to a recording instrument having an electrical measuring mechanism. Such instruments are used for recording electrical and mechanical operations, the latter being previously converted into electrical values. Thus, for example, current and voltage fluctuations, frequencies, power output, oscillations, numbers of revolutions or the like may be recorded. Known instruments of this type are provided with a recording device in which the record receiving or graph paper is fed from a supply roll over a writing support to a winding roll. This construction is complicated in mechanical respect and takes up much space, so that instruments using such an arrangement are large and expensive and moreover a small portion only of the graph is visible.

Another type of recording is provided by the circular card recording method, where a circular graph card rotates on an axis and the entire sequence of recording may thus be surveyed. The conventional constructions exhibit the great drawback of operating by means of an indicating mechanism imprinting the circular graph card from the front face thereof. In case the graph is inserted by inexperienced operators, the indicator may be deformed during this operation. The known instruments, moreover, predominantly operate with ink, which fact excludes their possible application for portable instruments or for recorders used in vehicles. Circular chart recorders which scratch a special paper require a very high torque for their measuring mechanism and therefore will also be eliminated for the aforementioned field of application, i.e. for the employment with low torque measuring mechanism.

It is an object of the present invention to provide a recording instrument of reduced size which operates without ink and which has its indicating mechanism protected against unauthorized interference. A further object of the invention is to provide a recording instrument having a measuring mechanism capable of recording minimum currents and voltages without requiring additional amplification. The instrument according to the invention is formed as circular graph recorder and comprises a mechanical driving unit for rotation of the circular graph card and in addition periodically scans the measuring member by means of a mechanical device and imprints the back side of circular card according to its particular position without impairing its adjusting force. This kind of recording combines the advantages of a small and simple recording instrument with those of an inkless and clear recording by means of a highly responsive electric measuring mechanism, the torque of which being required only for positioning the pointer, but not for the actual recording operation.

The present invention will now be described in more detail with reference to the accompanying drawings illustrating, by way of example, a preferred embodiment of the invention, and in which.

Figure 1:
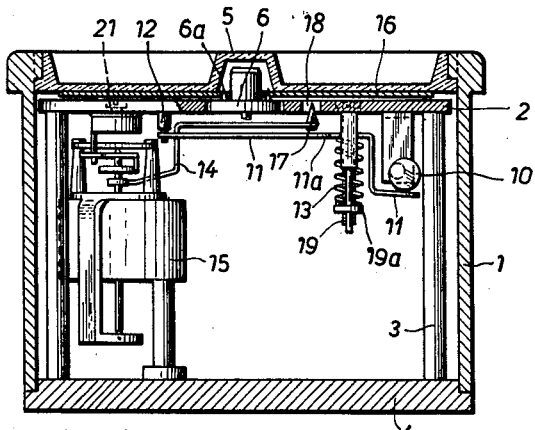
FIGURE 1 is a vertical section through the recording instrument.

According to FIGURE 1 the recording instrument comprises a casing including a square tubular member clamped to a bottom plate 4. A front plate is mounted on columns 3 screwed to the bottom 4. The tubular member 1 is closed on the top by a removable cover member 5 which protects the interior of the casing against dirt. The member 5 is of transparent material so that the entire graph card 16 is visible at all times. The closure member 5 urges the graph card 16 against a driver disc 6 provided with piercing points 6a for retaining the card. The member 5 also maintains the card in a plane position above the front plate 2 and serves as counter support for the indicator point 17.

Figure 2:
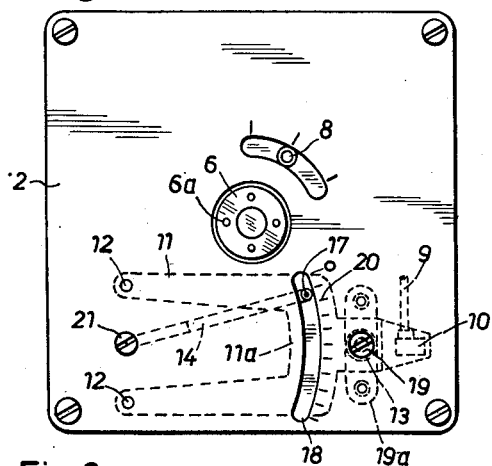
FIGURE 2 is a plan view on the front plate of the instrument with the cover member and the graph card removed.
Figure 3:
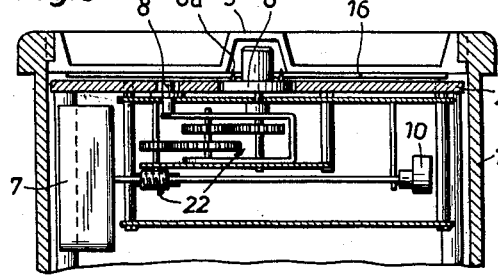
FIGURE 3 is a sectional view of the mechanical drive.
Figure 6:
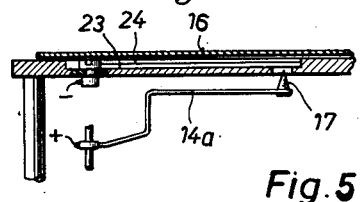
FIG. 6 is a sectional view of the modification of FIG. 5 with the graph card in place.

FIGURE 3 shows the electro mechanical driving mechanism within the tubular casing member. This mechanism includes a motor 7 which drives the driver disc 6 by means of a change speed gear train 22. As evident from FIGURE 2, the gears 22 can easily be changed from the front side by means of a lever 8, so that the graph card makes one revolution in one day, in seven days, or in thirty days. Concurrently with the gear train 22, the shaft 9 of the synchronous motor 7 also drives a cam disc 10; as indicated in FIGURE 1 said cam disc operatively engages a blade spring 11 which is mounted at 12 and pretensioned by a coil spring 13. When the cam shaft 9 and the cam 10 rotate, the spring 11 periodically is pressed downwardly by the cam and moves upwardly again by the action of the coil spring 13 which maintains the spring 11 applied against the cam. The spring 11 has a raised bridge portion 11a making contact with the indicator needle 14. The inserted graph card 16 is then periodically marked from the bottom side by the indicator point 17, according to the position of the needle 14 actuated by the measuring mechanism 15. The markings of the point 17 of the needle on the circular graph card 16 are made visible on the front side by a succession of points, forming together a line which constitutes a diagram as function of the position of the measuring mechanism 15. The writing point 17 moves for a short moment only in a narrow slot 18 of the front plate 2; it is completely covered by the inserted graph card 16, so that it cannot be deformed. The intensity of record line can be adjusted by a regulating screw 19 which may be turned to move a sliding nut 19a so as to tension the spring 13 more or less. The measuring mechanism can be adjusted to zero or any predetermined value of the graduation 20 by means of a screw 21.

The placing of the circular graph card 16 on the driver disc 6 is effected simply by opening the cover member 5 which may be connected to the tubular member 1 for example by means of a bayonet joint.

The graph card may consist of two layers, a bottom layer impregnated with ink, and an extremely thin top layer on which the graph is printed and which preferably consists of wax paper. When the needle point is applied against the bottom layer by the springs 13 and 11, some ink will be pressed out of the bottom layer and sucked up by the wax paper, marking a colored point thereon. The needle 14 is of thin sheet or wire material so as to be resiliently yielding when the point 17 is urged against the card 16.

An additional advantage of the described recorder consists in the fact that each recording operation is immediately visible and the entire recording process can be read at a glance. All elements of the described recording instrument are completely balanced, so that the instrument will correctly function in any position. Owing to this additional advantage it will be possible to mount the described recording instrument into vehicles in any position, even in locations which heretofore were completely unsuited for mounting recorders, and also to construct it particularly as a portable instrument having very small dimensions and low weight.

Figure 4:
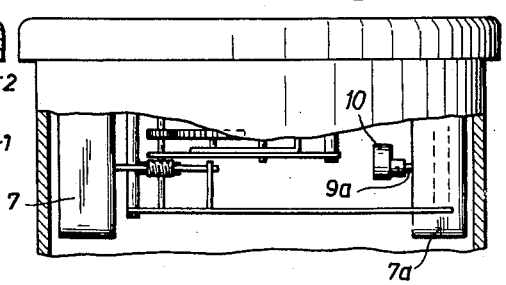
FIGURE 4 represents a modification of the drive mechanism.

According to FIGURE 4 the first wheel of the gear train 22 is driven by the motor 7 and shaft 9, while a second independent motor 7a is provided for driving the cam 10 by means of a shaft 9a. In this manner, the angular movement of the needle 14 and the up and down movement of the point 17 marking the graph card 16 can be made completely independent one from the other.

Figure 5:
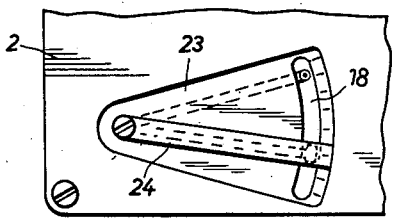
FIGURE 5 is a modification of the indicator means.

FIGURE 5 shows a modification in which the movement of the indicator needle 14a, in addition to marking the graph card 16, is used to initiate any desired control movement, for example to shut down a motor or engine when the measuring mechanism attains a certain predetermined position, corresponding to a particular angular position of the needle 14a.

The front plate 2 is provided with a recessed portion 23 in which is located an electrical contact strip 24 transversely extending across the slot 18 in which moves the point 17 of the needle 14a. The needle 14a and the contact strip 24 are connected in an electrical circuit which will be closed the moment the needle in its angular movement arrives underneath the contact strip, and the point 17, in its periodical up and down movement, is applied against the contact strip. The electric current impulse then flowing in the circuit can be used for effecting any remote control.

I claim:

1. A recording instrument comprising a casing, a front plate in the front of said casing having a slot therein, a measuring device in said casing, a graph card supporting disc, a circular wax-coated graph card on said supporting disc, a removable transparent closure cover on the casing over the front side of the graph card for retaining and supporting the graph card in the required position, a driving motor, a change speed gear driven by the motor and connected to said graph card supporting disc for rotation of said graph card supporting disc, a yieldingly resilient indicator needle mounted inside of said front plate and connected to said measuring device for angular movement in response to said measuring device, said indicator needle having a writing point penetrating through the slot in said front plate, a blade spring engaging said indicating needle, and a motor driven cam acting on said blade spring, whereby the writing point is periodically urged through said slot against the rear face of said graph card.

2. A recording instrument according to claim 1, in which there is provided a helical spring acting on said blade spring, and a regulating screw connected to said front plate and supporting said helical spring for varying the force by which the writing point is urged against the rear face of said graph card by turning said regulating screw.

3. A recording instrument according to claim 1, in which gears are provided between said motor and said cam.

4. A recording instrument according to claim 1, in which a further motor is provided and is connected to said cam.

References Cited in the file of this patent

UNITED STATES PATENTS

| 392,310 | Brewster | Nov. 6, 1888 |
| 506,406 | McAuthlin | Oct. 10, 1893 |
| 1,069,594 | Wurmb et al. | Aug. 5, 1913 |
| 1,169,508 | Porter | Jan. 25, 1916 |
| 1,738,563 | Chagnaud | Dec. 10, 1929 |
| 2,280,613 | Arey | Apr. 21, 1942 |
| 2,868,612 | Taylor et al. | Jan. 13, 1959 |

FOREIGN PATENTS

| 512,340 | Great Britain | Sept. 1, 1939 |
| 524,047 | Great Britain | July 29, 1940 |